United States Patent [19]

Sanders

[11] 4,254,086
[45] Mar. 3, 1981

[54] ENDOTHERMAL WATER DECOMPOSITION UNIT FOR PRODUCING HYDROGEN AND OXYGEN

[76] Inventor: Alfred P. Sanders, 17602 Point Comfort La., Webster, Tex. 77598

[21] Appl. No.: 973,578

[22] Filed: Dec. 27, 1978

[51] Int. Cl.³ .................. B01J 10/00; B01D 53/22; B01D 59/10; B32B 3/30
[52] U.S. Cl. ........................... 422/187; 55/158; 264/43; 264/65; 422/199; 428/137; 428/167; 428/472
[58] Field of Search ............... 422/129, 186, 187, 199, 422/208, 198 US; 55/16, 158; 428/137, 156, 167, 168, 472; 423/579, 648 R; 264/293, 43, 65

[56] References Cited

U.S. PATENT DOCUMENTS

| | | | |
|---|---|---|---|
| 2,824,620 | 2/1958 | De Rosset | 55/16 |
| 3,344,586 | 10/1967 | Langley et al. | 55/158 |
| 3,428,476 | 2/1969 | Langley et al. | 55/158 X |
| 3,499,265 | 3/1970 | Langley et al. | 55/158 |
| 3,534,531 | 10/1970 | Eguchi et al. | 55/158 |
| 4,003,725 | 1/1977 | Bunn, Jr. et al. | 55/158 |
| 4,019,868 | 4/1977 | Sebacher et al. | 422/208 |

Primary Examiner—Joseph Scovronek
Attorney, Agent, or Firm—Gilbert L. Wells

[57] ABSTRACT

The manufacture of hydrogen and oxygen by the dissociation of water vapor at elevated temperatures followed by separation of hydrogen from the water vapor and the oxygen produced using a hydrogen permeable membrane is improved by increasing the surface area of the membrane exposed to the dissociation gas mixture.

One way of increasing the surface area of contact, according to the present invention, is to form a hydrogen permeable membrane coated on one side of a porous refractory wafer with an inlet hole through the wafer connecting a beginning of the maze and an outlet at the end of the maze facing the opposite direction from the inlet. A number of these wafers are then stacked or replicated front-to-back with each outlet corresponding to the inlet of the next wafer to give a compact and efficient hydrogen diffusion separator.

13 Claims, 9 Drawing Figures

U.S. Patent    Mar. 3, 1981    Sheet 1 of 3    4,254,086
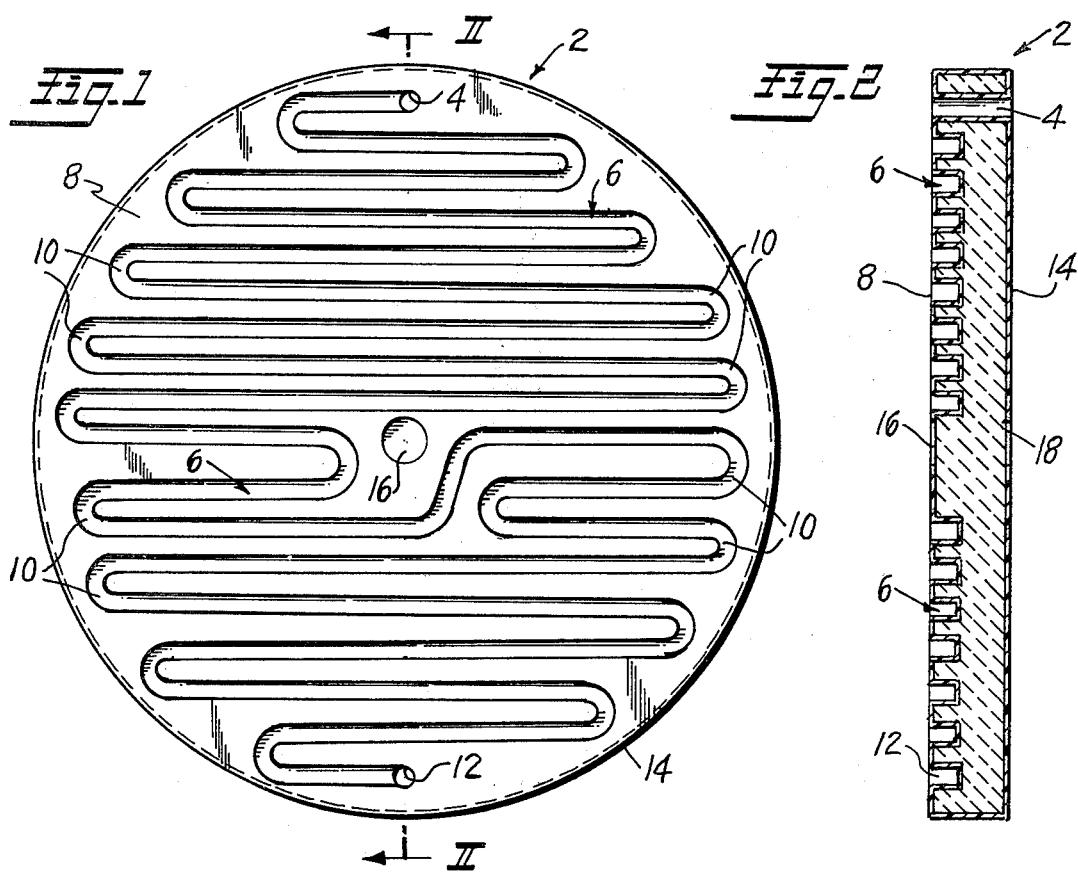
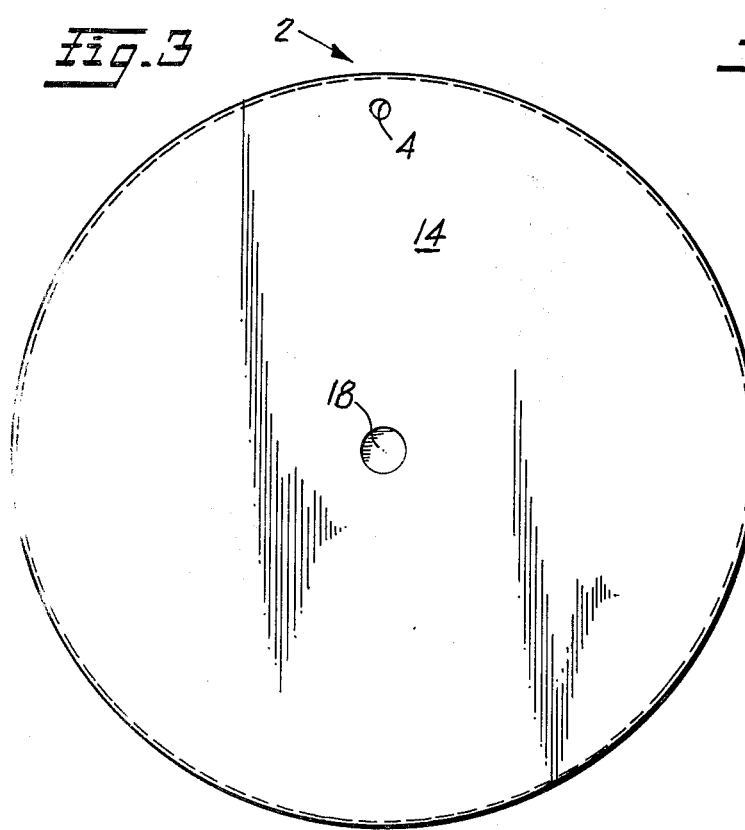
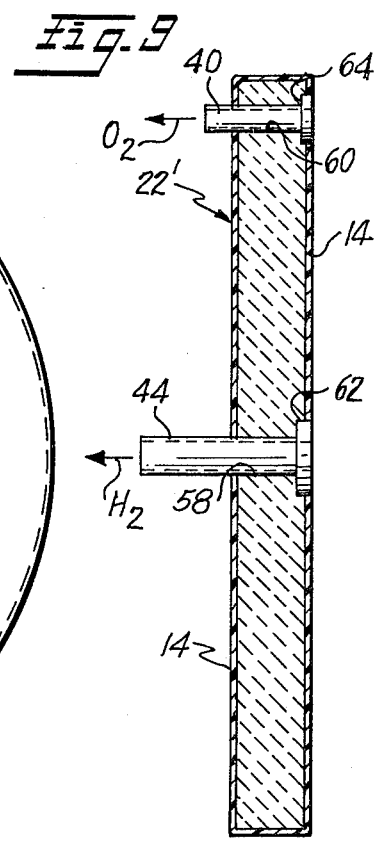

4,254,086

ENDOTHERMAL WATER DECOMPOSITION UNIT FOR PRODUCING HYDROGEN AND OXYGEN

BACKGROUND OF THE INVENTION

The field of the invention is gas separation by a barrier for selective diffusion of gases. The state of the art of dissociation of water vapor by thermal energy into hydrogen and oxygen followed by the separation of the hydrogen with a hydrogen permeable membrane is disclosed in U.S. Pat. Nos. 4,003,725; 4,019,868; and 4,053,576, the disclosures of which are incorporated herein and Technical Support Package TSP 75-10314 for NASA TECH BRIEF 75-10314 (MSC-12600) entitled "Using Permeable Membranes to Produce Hydrogen and Oxygen from Water," the disclosure of which is incorporated herein.

Solar heat is one of the ways used to thermally dissociate water vapor and this is disclosed in previously mentioned U.S. Pat. Nos. 4,019,868 and 4,053,576 and U.S. Pat. No. 4,030,890, the disclosure of which is incorporated herein. Other heat sources such as nuclear energy and electrical resistance furnaces are suitable for bringing water vapor to a dissociation temperature. TSP 75-10314 and U.S. Pat. No. 4,003,725 show resistance furnances suitable for the present invention.

That platinum, palladium and palladium alloy metal films are permeable to hydrogen and have been used as barriers for selective diffusion of hydrogen has been known, as disclosed by Kirk-Othmer "Encyclopedia of Chemical Technology", 2nd edition, vol. 15 (1968) under the section Platinum Group Metals, pages 832–860, particularly page 832 where the melting point of palladium is given as 1552° C., pages 853 and 854 where the use of palladium and a 75% Pd-25% Ag alloy is disclosed for the separation of pure hydrogen from mixed gases by diffussion at a temperature of 350° C. in tubes of the alloy with a wall thickness of about 0.003 inches and page 855 where electrodeposition of palladium is disclosed.

TSP 75-10314 discloses, among other things, the separation of hydrogen from oxygen and water vapor at temperatures of about 600° C. to 950° C. and pressures from about 5 mm Hg (0.1 psia) to 760 mm Hg (14.7 psia) using tubes of about 0.1 mm (0.004 inches) wall thickness as the diffusion membrane. This diffusion membrane was made from pure platinum, pure palladium, 75% palladium- 25% silver and 90% palladium-10% silver with 90% palladium-10% silver giving preferred results.

One of the many problems experienced by the prior art was to increase the surface area of contact at elevated temperatures between the platinum and palladium diffusion membranes and the dissociating water vapor or other hydrogen containing mixtures.

All prior art methods of producing hydrogen by dissociation of water vapor or from gaseous mixtures containing hydrogen have been limited by inability to separate large quantities of hydrogen from a mixture of hydrogen containing gas mixtures in a small space at elevated temperatures and at elevated pressures.

SUMMARY OF THE INVENTION

Having in mind the limitations of the prior art, it is an object of the present invention to provide a gaseous diffusion separator for hydrogen which provides a large diffusion area in a given space for separating pure hydrogen from a mixture of gases containing hydrogen.

Another object of the present invention is an improvement in the process of producing hydrogen from water by solar energy using the diffusion separator of the present invention.

Other objects of the present invention include the improvements in processes for separating hydrogen from a mixture of gases produced by the thermal dissociation of water vapor using surplus heat sources.

Still another object of the present invention is the recovery of the oxygen separated from the hydrogen by the selective diffusion.

According to the present invention, a mixture of gases containing hydrogen is prepared by the dissociation of water vapor at temperatures between about 350° C. and 1250° C., with a range of 550° C. to 950° C. preferred. This gaseous mixture is then passed through a maze which has a hydrogen permeable platinum group metal membrane, preferably an alloy of 90% palladium -10% silver, and hydrogen is separated to leave an oxygen enriched gas.

One embodiment of the gaseous diffusion maze is a plurality of wafers made from porous refractory materials, each of which has an inlet on one side connected with the beginning of the maze traced on the surface of the wafer and an outlet at the end of the maze on the opposite side of the wafer from the inlet. The porous refractory materials are coated with a film of the hydrogen permeable membrane (90% Pd-10% Ag) so that the maze for the transport of the dissociating water vapor is surrounded by the hydrogen permeable membrane.

A plurality of these wafers is stacked back-to-front with the respective outlet to inlet indexed so that a continuous path is created from wafer to wafer.

Hydrogen separated through the membrane is passed through the porosity of the refractory and can be directed to a particular section of the wafers for transport and collection. In one embodiment, the whole wafer is coated with 90% Pd-10% Ag except for a circle at the center of the wafer to which hydrogen is directed. In another embodiment the edges are left uncoated and hydrogen passes through these edges as water vapor is introduced at the beginning of the maze and oxygen is separated and collected at the end of the maze.

BRIEF DESCRIPTION OF THE DRAWINGS

The invention is better explained in more detail by reference to the attached drawings, wherein:

FIG. 1 is a front elevation view of one embodiment of an individual integral wafer of the present invention having a gas diffusion maze therein;

FIG. 2 is a side view along the line II—II of FIG. 1;

FIG. 3 is a rear elevation view of the wafer of FIG. 1 showing the inlet hole and hydrogen passage therein;

FIG. 9 is a detailed showing in cross-section of the end wafer of FIG. 4 with a stainless steel or palladium outlet conduit mounted therein for the hydrogen and oxygen.

DESCRIPTION OF THE PREFERRED EMBODIMENT

Figures 4, 5:
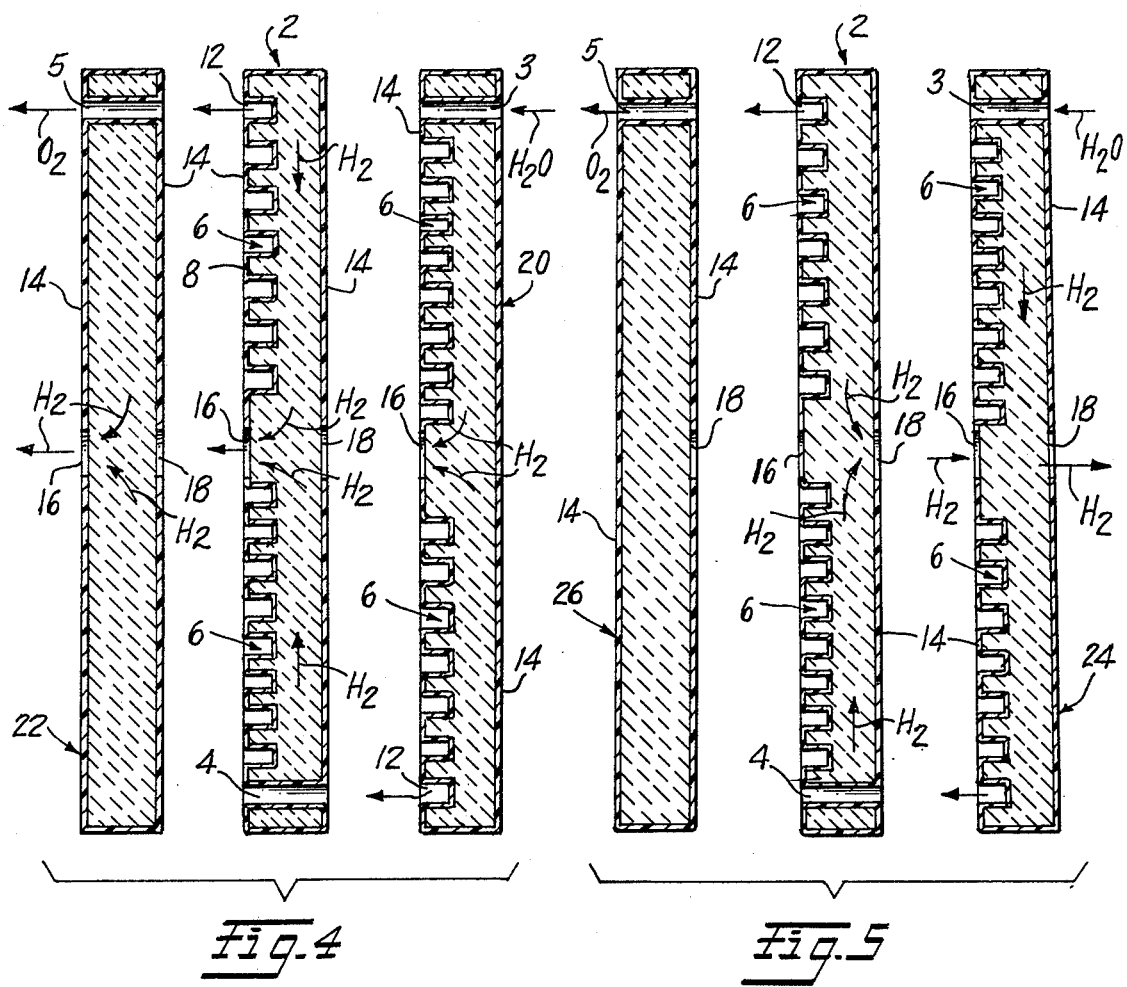
FIG. 4 is an exploded, partial side view showing in cross-section one embodiment of a wafer combination of the present invention in assembly with the outlet wafer on the left, the inlet wafer on the right, and one example of the plurality of intermediate wafers of FIGS. 1-3 therebetween.
FIG. 5 is another embodiment of the assembly of FIG. 4 which takes advantage of countercurrent circulation of the hydrogen produced.

With particular reference to FIGS. 1–3, the integral porous refractory wafer 2 is shown having an inlet hole 4 through the wafer from back-to-front. A maze 6 is acid etched, molded, pressed, sintered or gouged across at least one flat surface 8 of the wafer. The maze has a plurality of turns or corners 10 ending at outlet 12 which faces out in FIG. 1.

The front, back and edge of the wafer are coated with a hydrogen permeable membrane 14 such as 10% Ag-90% Pd with the exception of concentric circles 16 and 18 where the porous refractory material, such as $Al_2O_3$, shows through.

The wafer 2 of FIGS. 1–3 is shown in the partial exploded view of FIG. 4 as the second wafer from the right. Wafers 20 and 22, which are the first and last wafers in an assembly, differ from the plurality of wafers 2 making up the composite assembly. In the embodiment of FIG. 4, the first wafer 20 has no hole 18 on the outside wall and the last wafer 22 need not have a maze on either flat surface. Wafer 20 has water vapor inlet 3 and wafer 22 has oxygen outlet 5.

FIG. 5 is another embodiment of FIG. 4 wherein first wafer 24 has circle 18 with the porous refractory material showing through the outside wall. Last wafer 26 has no circle in the outside wall as does wafer 22 of FIG. 4.

Figure 6:
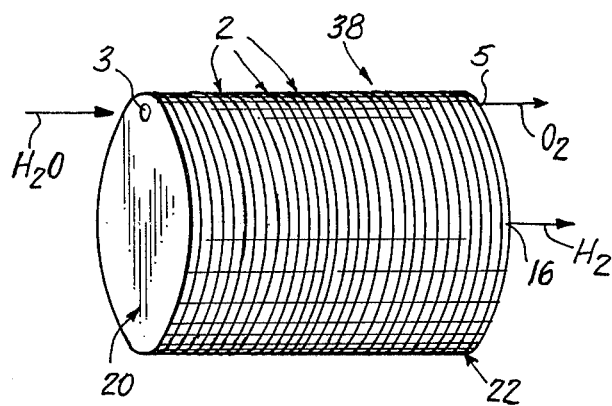
FIG. 6 is a perspective view of an assembly of wafers from FIG. 4.

FIG. 6 is a perspective showing of an assembly of FIG. 4 defining the endothermal wafer decomposition unit 38 of the present invention having a plurality of wafers 2 sandwiched between frist and last wafers 20 and 22.

Figure 7:
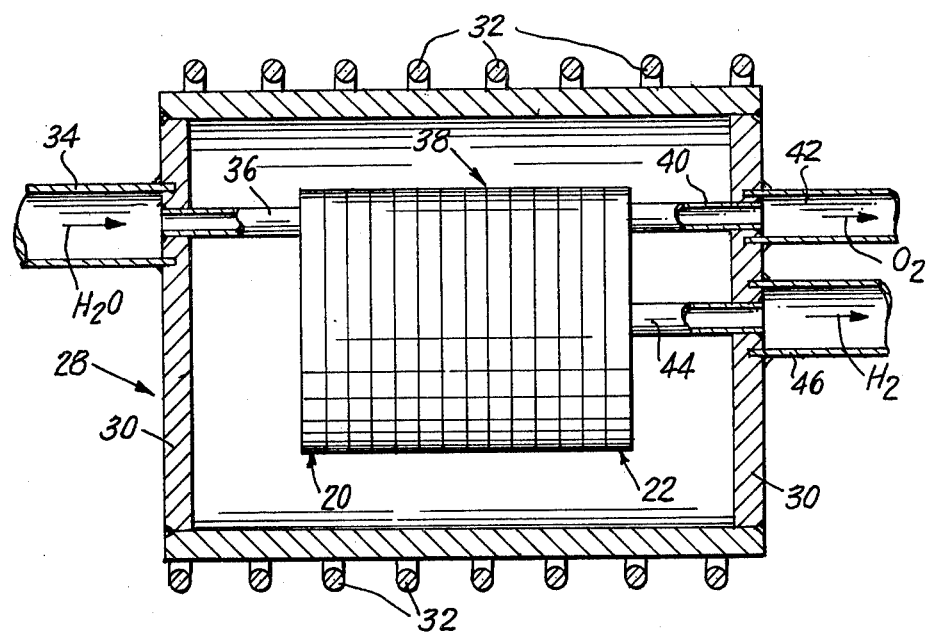
FIG. 7 shows the assembly of wafers of FIG. 6 mounted in an electric resistance furnace.

FIG. 7 shows the assembly of FIG. 4 mounted in an electric resistance furnace 28 having stainless steel walls 30 and a plurality of heating elements 32. A water vapor inlet 34 of stainless steel tubing enters on the left and the water vapor is passed through 10% Ag-90% Pd tubing 36 into the assembly 38. The 10% Ag-90% Pd collared tubing 40 connects with the $O_2$ outlet of wafer 22 for distribution to stainless steel outlet 42 containing $O_2$. 10% Ag-90% Pd collared tubing 44 conducts $H_2$ from circle 16 on wafer 22 through the wall of the furnace to $H_2$ collecting tube 46.

Figure 8:
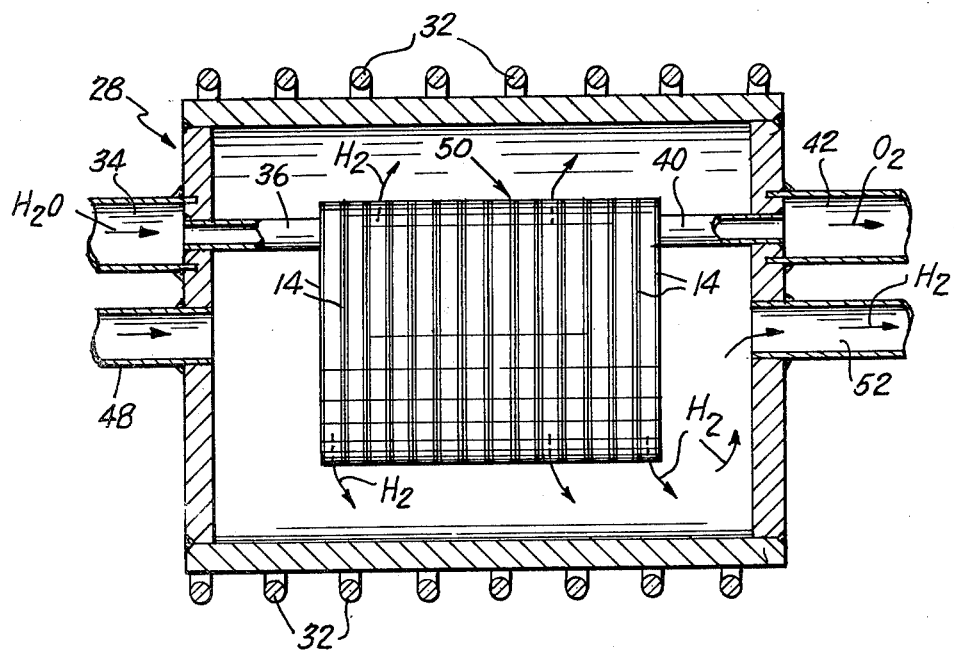
FIG. 8 shows another embodiment of an assembly of wafers mounted in an electric resistance furnace where the porous edges of the wafers are uncoated with the hydrogen permeable membrane and hydrogen being produced from the porous edges.

In the embodiment of FIG. 8, the wafers have edges which are porous and uncoated so that hydrogen produced in the endothermal water decomposition unit 50 can diffuse to the outside of the unit and be picked up by an inert carrier gas such as nitrogen which enters through stainless steel conduit 48. The hydrogen produced is swept out of the furnace by the inert carrier for collection through stainless steel conduit 52.

FIG. 9 shows one way of mounting conduits 44 and 40 in the hydrogen and oxygen outlets of the last wafer 22' of the assembly. The wafer 22' has holes 58 and 60 with respective recesses 62 and 64 molded therein in the green state for holding the collared conduits 44 and 40. Of course, a collared conduit 36 can be mounted in the same way in the first wafer 20.

BEST MODE OF OPERATION

The best mode of carrying out the present invention is disclosed with particular reference to FIGS. 4, 5, 7 and 8.

Water vapor is introduced into the furnace of FIG. 7 by way of stainless steel conduit 34 and conduit 36 or inlet 3 into the endothermal water decomposition unit 38. Inside the furnace the temperature is conveniently maintained between about 350° C. and 1250° C. and pressures of from 5 mm Hg to superatmospheric can be maintained.

Even though the platinum group metal membrane is applied in a thickness of about 0.0005–0.005, preferably 0.001–0.003, a considerable pressure, superatmospheric, can be applied inside the endothermal water decomposition unit because the porous refractory wafer backing of the membrane is strong in compressive load. Of course, it is possible to do away with the 90% Pd-10% Ag conduits 36, 40 and 44 in high pressure applications by having the inlet 2 and the outlets 5 and 16 register with conduits 34, 42, and 46 under compressive load from the walls of the furnace.

As shown in FIG. 4, the water vapor enters at inlet 3, travels through the platinum or palladium metal coated maze of wafer 20 and $H_2$ is diffused through the membrane in the grooves of the maze into the porosity of the refractory of wafer 20. $H_2$ diffuses simultaneously through the membrane on the right of wafer 2 opposite the maze and grooves of wafer 20. $H_2$ moves through the porosity of wafer 20 to the uncoated center hole 16 where it is chanelled from wafer to wafer through the centers thereof.

After passing to the outlet 12 of wafer 20, the oxygen enriched water vaper now passes through inlet 4 of wafer 2 and proceeds through the maze of wafer 2 where the water vapor becomes more enriched with oxygen. Hydrogen passes through the membrane into the porosity of the wafer and proceeds to the collection area in the centers of the wafers. The same mechanism of integral wafer 2 takes place through the stack of wafers until the last wafer 22 is reached and oxygen exits from outlet 5 and hydrogen exits from outlet 16.

FIG. 5 shows the invention operated with countercurrent flow of the hydrogen. This is accomplished by having a circle of uncoated refractory 18 on the first wafer 24.

The process of FIG. 8 is carried out by leaving the porous edges of the wafers uncoated so that the hydrogen is passed directly into the body of the furnace. At elevated pressures, there is no need for an inert carrier gas but when the separation is carried out at less than atmospheric pressure, it is necessary to pass an inert carrier gas such as nitrogen or argon therethrough.

SPECIFIC EXAMPLES

The wafers of the present invention may be made from refractory materials or from refractory metals. Kirk-Othmer, ibid., discloses in vol. 17 (1968) suitable refractories, with the exception of silica refractories which poison the platinum group membranes, on pages 227–267, particularly page 243 which discloses aluminum oxide, beryllium oxide, calcium oxide, magnesium oxide, thorium oxide, titanium oxide, uranium oxide, and spinel. The refractory metals are disclosed on pages 267–284, particularly page 267 which discloses the iridium, rhodium, chromium and platinum are resistant to air at 1400° C.

The refractory materials can be processed into the wafers of the present invention using the techniques disclosed in Kirk-Othmer, ibid, Supplement Volume (1971), p. 150 where the cold pressing and isotactic pressing of aluminum oxide ceramics is disclosed.

The refractory metals can be processed into porous wafers using the techniques of powder metallurgy as disclosed in Kirk-Othmer, ibid, vol. 16 (1968), pages 401–435, particularly page 415 where sintering is disclosed and page 425 where the preparation of porous sintered materials is disclosed.

The porosity in the manufacture of the porous refractory wafers of the present invention can be controlled by using the techniques disclosed for the manufacture of aluminum oxide abrasive grinding wheels as disclosed in Kirk-Othmer, ibid, vol. 1 (1963), page 32, where a chart of the grain sizes used is given, pages 34 and 35, where the control of open structure is disclosed and pages 35 and 36 where the methods of manufacture are given.

In addition to the above procedures for frabricating the wafers of the present invention, it is also possible to use the techniques disclosed in U.S. Pat. Nos. 3,344,586; 3,428,476 and 3,499,265, but with the addition of the step of molding a maze into at least one side of the wafer when the ceramic or refractory material is in the green state.

EXAMPLE 1

Having all the above in mind, a porous refractory wafer can be produced for the present invention as follows:

A dry mixture of 25% Georgia kaoline, 15% Tennessee ball clay, 55% nepheline syenite, and 5% silica is made by tumbling these ingredients in a bottle for several hours after which 200 mesh carbon black is added and thoroughly mixed in by further tumbling for about 8 hours. The porosity of the finished piece is largely determined by the amount of carbon black used and for a porosity of 40–50%, which is preferred in accordance with the invention, the proportion of carbon black to the other ingredients is about 20–40%.

When the dry mixing is complete, the mixture is dampened with a fluid which serves as a binder and lubricant. The moisture content is preferably about 25–30% which supplies the moisture necessary to be able to press the mass into the desired disk shape satisfactorily. The fluid is suitably 3–10% glycerine as the binder and the remainder water as the lubricant.

The fluid is mixed in to dampen the mixture thoroughly.

Then the mixture is molded in a round mold having a plunger design which produces the maze as shown in FIG. 1 of the present invention. Although wafers of 3 inch diameter and about ⅛ inch thick were produced, any suitable size can be made. These wafers are then air dried over-night and fired in a periodic furnace which is raised to a temperature of about 1100° C. progressively over a period of about 24 hours.

The porous ceramic wafers are first coated on the maze side with palladium by brushing on a solution of palladium resinate dissolved in oil of peppermint and chloroform and containing 4.5% Pd of weight. Twelve coats are applied with each fired at about 350° C. in air to thermally decompose the resinate of metal. After 12 coats, a palladium film about 1.2 microns thick is on the substrate. This film is the fired to 1000° C. in air with a one hour soak to compact the film and bond it to the substrate.

The uncoated circle indicated at 16 in FIG. 1 is maintained by placing a cardboard circle thereover and then removing it after all layers have been applied.

A silver naphthenate solution having a viscosity suitable for application by brushing was made as follows:

|  | Grams |
|---|---|
| Silver naphthenate (32% Ag) | 3.35 |
| Toluene | 11.13 |
|  | 14.48 |

The silver naphthenate was dissolved to a stiff gel by stirring mechanically for 2 hours at room temperature. 0.52 Grams of t-octyl amine were then added and, with stirring continued for a few more minutes. The solution became fluid. The amber brushing solution then contained 7.15% Ag by weight or approximately 0.01 mole of silver naphthenate and 0.004 mole of amine.

The silver naphthenate solution is then applied by brushing over the palladium in several coats with each fired at about 200° C. in air. When a silver weight equal to ⅓ the palladium weight has been added, the coated ceramic is heated for 4 hours at 600° C. in hydrogen to form a 75:25 Pd:Ag allow in situ.

The other side of the wafer and the edges are then coated as above to produce a wafer coated except for bare circles 16 and 18 on the front and back as shown in FIGS. 1–3.

EXAMPLE 2

The method of Example 1 is carried out for molding and preparing wafers prior to coating. In this example, only the maze 6 of FIG. 1 is coated and the back of the wafer is coated following the techniques of Example 1. Such wafers are useful in the apparatus shown in FIG. 8.

EXAMPLE 3

The method of Example 1 is modified slightly to prepare the wafer 20 of FIG. 4. No circle of cardboard is used in the coating of the right side of wafer 20 to prevent a coating.

EXAMPLE 4

One wafer from Example 3 and a plurality of wafers from Example 1 are secured together to make an assembly by brushing powdered glaze material, such as "Pemco frit P-1701" on a small portion of adjacent flat sides taking care not to coat the maze. The glaze is fired to fuse the wafers together.

I claim:

1. A coated article comprising a porous refractory base material with a hydrogen permeable membrane coated on portions thereof, said base material having at least first and second flat surfaces, said base material having a top and a bottom, a hole extending through said base material at the top thereof, a grooved maze in at least one of said flat surfaces extending from said hole at the top of the bottom and said grooved maze coated with said hydrogen permeable membrane.

2. The coated article of claim 1, wherein said base material is selected from the group consisting of aluminum oxide, beryllium oxide, calcium oxide, magnesium oxide, thorium oxide, titanium oxide, uranium oxide, spinel, iridium, rhodium, chromium and platinum.

3. The coated article of claim 1, wherein said hydrogen permeable membrane is selected from the group consisting of platinum, palladium and alloys of silver and palladium.

4. The coated article of claim 1, wherein circular portions at the centers of said flat surfaces are uncoated and the remainder of said flat surfaces and the edges of said base material are coated with said hydrogen permeable membrane.

5. The coated article of claim 1, wherein a circular portion at the center of said second flat surface having said maze is uncoated and the remainder of said flat surfaces and the edges of said base material are coated with said hydrogen permeable membrane.

6. The coated article of claim 1, wherein said coated grooved maze is in said second flat surface and said first flat surface is coated with said hydrogen permeable membrane.

7. The coated article of claim 4, wherein said hydrogen permeable membrane has a thickness of about 0.0005–0.005 inches.

8. The coated article of claim 7, wherein said hydrogen permeable membrane has a thickness of about 0.001–0.003 inches.

9. An apparatus for separating hydrogen from a hydrogen containing gas mixture comprising a plurality of wafers stacked back-to-front, each of said wafers comprising a porous refractory base material with a hydrogen permeable membrane coated on portions thereof, said base material having at least first and second flat surfaces, said base material having a top and a bottom, a hole extending through said base material at the top thereof and defining an inlet, a grooved maze in said second flat surface extending from said hole at the top of the said bottom and defining an outlet at the termination thereof, said grooved maze and said first flat surface coated with said hydrogen permeable membrane and said outlets of successive wafers registered with said inlets of successive wafers in said plurality.

10. The apparatus of claim 9, wherein a circle of uncoated base material is located on said first and second flat surfaces at the center thereof and the remainder of the said flat surfaces and the edges of said base material are coated with said hydrogen permeable membrane.

11. The apparatus of claim 9, wherein a circle of uncoated base material is located on said second flat surface at the center thereof and the remainder of said flat surfaces and the edges of said base material are coated with said hydrogen permeable membrane.

12. An apparatus for separating hydrogen and oxygen from thermally dissociating water vapor comprising:
(a) a closed furnace chamber;
(b) means for heating said chamber;
(c) means for introducing water vapor into said chamber;
(d) means for removing hydrogen from said chamber;
(e) means for removing oxygen from said chamber;
(f) means for separating hydrogen and oxygen from thermally dissociating water vapor comprising a plurality of wafers stacked back-to-front, each of said wafers comprising a porous refractory base material with a hydrogen permeable membrane coated on portions thereof, said base material having at least first and second flat surfaces, said base material having a top and a bottom, a hole extending through said base meterial at the top thereof and defining an inlet, a grooved maze in said second flat surface extending from said hole at the top to said bottom and defining an outlet at the termination thereof, said grooved maze and said first flat surface coated with said hydrogen permeable membrane and said outlets and successive wafers registered with said inlets of successive wafers in said plurality, the first of said inlets connected with said means for introducing water vapor and the last of said outlets connected to said means for removing oxygen from said chamber.

13. The apparatus of claim 12, wherein a circle of uncoated base material is located on said first and second surfaces at the center thereof and the remainder of said flat surfaces and the edges of said base material are coated with said hydrogen permeable membrane, said circles connected with said means for removing hydrogen from said chamber.

* * * * *